United States Patent
Zekelman et al.

(10) Patent No.: US 10,976,906 B2
(45) Date of Patent: Apr. 13, 2021

(54) DETECTION AND VISUALIZATION OF A FORMATION OF A TANGIBLE INTERFACE OBJECT

(71) Applicant: Tangible Play, Inc., Palo Alto, CA (US)

(72) Inventors: Ariel Zekelman, Palo Alto, CA (US); Tony Aube, Palo Alto, CA (US); Jerome Scholler, San Francisco, CA (US); Mark Solomon, Palo Alto, CA (US); Arnaud Brejeon, Yorba Linda, CA (US)

(73) Assignee: Tangible Play, Inc., Palo Alto, CA (US)

( * ) Notice: Subject to any disclaimer, the term of this patent is extended or adjusted under 35 U.S.C. 154(b) by 0 days.

(21) Appl. No.: 16/230,265

(22) Filed: Dec. 21, 2018

(65) Prior Publication Data
US 2019/0196700 A1 Jun. 27, 2019

Related U.S. Application Data

(60) Provisional application No. 62/609,089, filed on Dec. 21, 2017.

(51) Int. Cl.
| G06F 3/0484 | (2013.01) |
| G06F 3/042 | (2006.01) |
| G06F 9/451 | (2018.01) |
| G06F 1/16 | (2006.01) |
| G06F 3/0354 | (2013.01) |

(52) U.S. Cl.
CPC ........ *G06F 3/04845* (2013.01); *G06F 1/1686* (2013.01); *G06F 3/03545* (2013.01); *G06F 3/0425* (2013.01); *G06F 9/451* (2018.02); *G06F 9/453* (2018.02)

(58) Field of Classification Search
CPC .... G06F 3/04845; G06F 1/1686; G06F 9/451; G06F 3/03545; G06F 9/453; G06F 3/0425
See application file for complete search history.

(56) References Cited

U.S. PATENT DOCUMENTS

| 8,913,037 | B1 | 12/2014 | Liu et al. |
| 9,158,389 | B1 * | 10/2015 | Sharma ............... H04N 5/2252 |
| 9,354,716 | B1 | 5/2016 | Sharma et al. |
| 2008/0260244 | A1 | 10/2008 | Kaftory et al. |
| 2014/0267409 | A1 | 9/2014 | Fein et al. |
| 2014/0354593 | A1 | 12/2014 | Rotaru |

(Continued)

FOREIGN PATENT DOCUMENTS

DE 112011102169 T5 4/2013

*Primary Examiner* — Matthew Ell
(74) *Attorney, Agent, or Firm* — Patent Law Works LLP

(57) ABSTRACT

Various implementations for detection and visualization of a formation of a tangible interface object include a method that includes capturing a video stream that includes an activity object and a formation of a tangible interface object, identifying the activity object, determining a virtual object based on the identity of the activity object, displaying a graphical user interface embodying a virtual scene and including the virtual object, detecting a formation of the tangible interface object, generating a virtualization based on the formation of the tangible interface object, and updating the graphical user interface to include the visualization.

20 Claims, 14 Drawing Sheets

(56) References Cited

U.S. PATENT DOCUMENTS

| | | | |
|---|---|---|---|
| 2015/0339532 A1* | 11/2015 | Sharma | G06K 9/00671 |
| | | | 345/633 |
| 2016/0378296 A1* | 12/2016 | Mishra | G06T 19/006 |
| | | | 345/633 |
| 2017/0140552 A1 | 5/2017 | Woo et al. | |
| 2019/0196609 A1 | 6/2019 | Aube et al. | |

* cited by examiner

DETECTION AND VISUALIZATION OF A FORMATION OF A TANGIBLE INTERFACE OBJECT

CROSS-REFERENCE TO RELATED APPLICATIONS

The present application claims the benefit under 35 U.S.C. § 119(e) of U.S. Provisional Patent Application Ser. No. 62/609,089, entitled "Virtual Response to Physical Interaction," filed on Dec. 21, 2017, the entire contents of which are incorporated herein by reference.

BACKGROUND

The present disclosure relates to detection and visualization of a formation of a tangible interface object, and in a more specific non-limiting example, detection and identification of an activity object.

A tangible object visualization system allows a user to use the visualization system to capture tangible objects and see the objects presented as visualizations on an interface within the system. Providing software-driven visualizations associated with the tangible objects allows for the user to interact and play with tangible objects while also realizing the creative benefits of the software visualization system. This can create an immersive experience where the user has both tangible and digital experiences that interact with each other.

In some solutions, objects may be placed near the visualization system and a camera may capture images of the objects for image processing. However, the images captured by the camera for image processing, require the object to be placed in a way that the image processing techniques can recognize the object. Often, when a user is playing with the object, such as when using the visualization system, the object will be obscured by the user or a portion of the user's hand and the movement and placement of the visualization system may result in poor lighting and image capture conditions. As such, significant time and processing must be spent to identify the object and if the image cannot be analyzed because of poor quality or the object being obscured, then a new image must be captured, potentially resulting in losing a portion of an interaction with the object by the user.

Some visualization systems attempt to address this problem by limiting the ways in which a user can interact with an object in order to capture images that are acceptable for image processing. For example, the visualization system may require that only specific objects that are optimized for image processing be used and may even further constrain the user by only allowing the objects to be used in a specific way. However, limiting the interactions, such as by requiring a user to place an object and not touch it, often create a jarring experience in which the user is not able to be immersed in the experience because of the constraints needed to capture the interactions with the object. Limiting the objects to only predefined objects also limits the creativity of the user.

Further issues arise in that specific setup of specialized objects in a specific configuration is often required in order to interact with the objects and the system. For example, an activity surface must be carefully setup to comply with the calibrations of the camera and if the surface is disturbed, such as when it is bumped or moved by a user, the image processing loses referenced calibration points and will not work outside of the constraints of the specific setup. These difficulties in setting up and using the visualization systems, along with the high costs of these specialized system has led to limited adoption of the visualization systems because of the user is not immersed in their interactions with the objects.

SUMMARY

According to one innovative aspect of the subject matter in this disclosure, a method for detecting a pointing object and activity object is described. In an example implementation, a method includes capturing, using a video capture device associated with a computing device, a video stream of a physical activity scene proximate to the computing device, the video stream including an activity object, the activity object including a visualization marker and an interaction area, the interaction area including a tangible interface object formed in the interaction area; identifying, using a processor of the computing device, the activity object based on the visualization marker; determining, using the processor of the computing device, a virtual object based on the identity of the activity object; displaying, on a display of the computing device, a graphical user interface embodying a virtual scene, the virtual scene including the virtual object; detecting, using the processor of the computing device, a formation of the tangible interface object in the interaction area; generating, using the processor of the computing device, a virtualization based on the formation of the tangible interface object; and updating, on the display of the computing device, the graphical user interface to include the visualization.

Implementations may include one or more of the following features. The method where the tangible interface object is a drawing and the formation of the tangible interface object is a creation of the drawing by a user. The method where the activity object further includes a reference object, the reference object providing an indicator of the formation of the tangible interface object. The method where detecting the formation of the tangible interface object in the interaction area further includes: detecting, using the processor of the computing device, a boundary of the tangible interface object; and extracting, using the processor of the computing device, an image of the tangible interface object from the video stream based on the boundary. The method where updating the graphical user interface to include the visualization further includes: matching the boundary of the extracted image with a portion of the virtual object. The method where the visualization marker represents a type of the activity object and where identifying the activity object based on the visualization marker further includes: identifying, using the processor of the computing device, the type of the activity object based on the visualization marker. The method where the interaction area includes an outline of the tangible interface object.

One general aspect includes a physical activity scene visualization system including: a video capture device coupled for communication with a computing device, the video capture device being adapted to capture a video stream that includes an activity object, the activity object including an interaction area, the interaction area including a tangible interface object formed in the interaction area; a detector coupled to the computing device, the detector being adapted to identify within the video stream the activity object and a formation of the tangible interface object in the interaction area; a processor of the computing device, the processor being adapted to identify the activity object, determine a virtual object based on the identity of the activity object, and generate a virtualization based on the detected formation of the tangible interface object; and a display coupled to the computing device, the display being adapted to display a graphical user interface embodying a virtual scene, the virtual scene including the virtual object and updating the graphical user interface to include the visualization.

Implementations may include one or more of the following features. The physical activity scene visualization system where the tangible interface object is a drawing the formation of the tangible interface object is a creation of the drawing by a user. The physical activity scene visualization system where the activity object further includes a reference object, the reference object providing an indicator of the formation of the tangible interface object. The physical activity scene visualization system where the detector is further configured to: detect a boundary of the tangible interface object; and extract an image of the tangible interface object from the video stream based on the boundary. The physical activity scene visualization system where the processor configured to generating the virtualization is further configured to match the boundary of the extracted image with a portion of the virtual object. The physical activity scene visualization system where the activity object includes a visualization marker and the visualization marker represents a type of the activity object and the detector is further configured to: identify the type of the activity object based on the visualization marker. The physical activity scene visualization system where the interaction area includes an outline of the tangible interface object.

One general aspect includes a method including: capturing, using a video capture device associated with a computing device, a video stream of a physical activity scene proximate to the computing device, the video stream including an activity object, the activity object including a visualization marker and an interaction area, the interaction area including a drawing by a user in the interaction area; identifying, using a processor of the computing device, a type of the activity object based on the visualization marker; determining, using the processor of the computing device, a virtual scene for display, the virtual scene including a virtual object to prompt the user; displaying, on a display of the computing device, a graphical user interface embodying a virtual scene, the virtual scene including the virtual object; detecting, using the processor of the computing device, the drawing in the interaction area; generating, using the processor of the computing device, a virtual image of the drawing by the user; and updating, on the display of the computing device, the graphical user interface to include the virtual image of the drawing.

Implementations may include one or more of the following features. The method where the activity object is a drawing pad and the visualization marker represents a page of the drawing pad. The method where the virtual object is a graphical representation of a portion of a graphical representation that is missing a feature and the drawing fills in that portion of the graphical representation with the missing feature. The method where updating the graphical user interface to include the virtual image of the drawing further includes: detecting, using the processor of the computing device, a boundary of the virtual image; and matching, using processor of the computing device, the boundary of the virtual image to the portion of the graphical representation with the missing feature. The method where generating the virtual image further includes: detecting, using the processor of the computing device, a boundary of the drawing; and extracting, using the processor of the computing device, an image of the drawing from the video stream based on the boundary.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein provides a platform for detecting and visualization of a formation of a tangible interface object. For example, a user may form a tangible interface object, such as by drawing, placing, molding, joining, etc. in a physical activity scene. The platform may detect that formation of the tangible interface object and generate a virtualization based on the formation of the tangible interface object. The platform may then display a virtual scene that includes the virtualization. By detecting a formation of a tangible interface object and generating a visualization of that tangible interface object, a user is able to expand their creativity and form tangible interface objects that they can then interact within the virtual scene without removing themselves from the immersiveness of a physical activity scene.

Figure 1A:
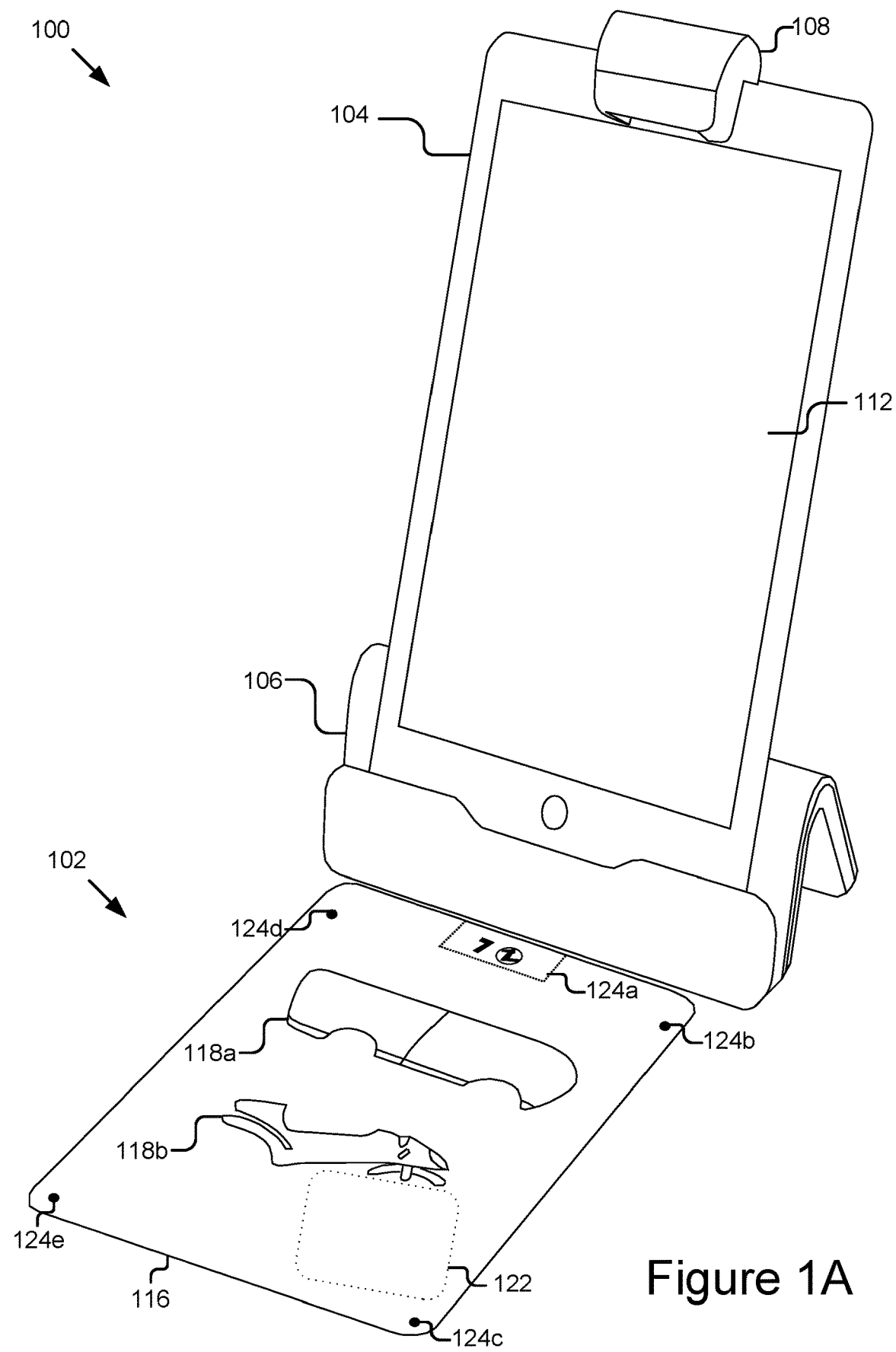
FIGS. 1A-1E are example configurations of a visualization platform for detection and visualization of a formation of a tangible interface object.

FIGS. 1A-1E are example configurations of a visualization platform for detection and visualization of a formation of a tangible interface object. FIG. 1A is an example configuration 100 of a system. The configuration 100 may be used for various activities in the physical activity scene that includes an activity object 116. As depicted, the configuration 100 includes, in part, a tangible, physical activity surface 102 (not shown) on which a tangible interface object 120 (not shown) may be formed (e.g., placed, drawn, created, molded, built, projected, etc.) and a computing device 104 that is equipped or otherwise coupled to a video capture device 110 (not shown) coupled to an adapter configured to capture video of the activity surface 102 that includes the physical activity scene. The computing device 104 includes novel software and/or hardware capable of displaying a virtual scene 112 including in some implementations a virtual object 126 (not shown) and/or a virtualization 138 (not shown) of the tangible interface object 120.

While the activity surface 102 on which the platform is situated is depicted as substantially horizontal in FIG. 1, it should be understood that the activity surface 102 can be vertical or positioned at any other angle suitable to the user for interaction. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc. The activity surface 102 may additionally or alternatively include a medium on which the user may render tangible interface object(s) 120, such as paper, canvas, fabric, clay, foam, or other suitable medium.

In some implementations, the activity surface 102 may be preconfigured for certain activities. As depicted in FIGS. 1A-1E, an example configuration may include an activity surface 102 that includes an activity object 116. In some implementations, the activity object 116 may be separate from the activity surface 102, while in further implementations, the activity object 116 may be formed out of the activity surface 102, projected onto the activity surface 102, etc. In some implementations, the activity object 116 may be any type of object that may be used for interacting in the virtual scene 112. It should be understood that while the activity object 116 is presented as a surface, such as notepad page made out of paper or cardstock, or an activity board made out of sturdy plastic, metal, and/or cardboard, in further implementations, the activity object 116 may take on any form such as a ball, a vehicle track, a book, a tangible object etc. In further implementations, the activity object 116 may be configured for creating and/or drawing, such as a notepad, whiteboard, or drawing board. In some implementations, the activity object 116 may be reusable and a tangible interface object 120 formed on the activity object 116 may be removed, erased, hidden, etc.

In some implementations, the activity object 116 may include an interaction area 122 that includes a portion of the activity object 116. In some implementations, the interaction area 122 may signal to a user where a tangible interface object 120 may be formed by a user 130 (not shown). In some implementations, the interaction area 122 may be visible to the user, such as by creating a box or other shape and emphasizing the edges of the interaction area 122, such as by creating contrasting colors, a dotted line, etc. In some implementations, the interaction area 122 may be detectable by the computing device 104 and the computing device 104 may be configured to analyze the interaction area using image processing techniques to detect the formation of the tangible interface object 120. In some implementations, the edges of the interaction area 122 may not be visible to a user 130 and the activity object 116 may signal where the user 130 should form the tangible interface object 120. For example, a motorcycle may be displayed on the activity object 116 that is missing a wheel and the user 130 may form a tangible interface object 120 that represents the wheel in the space of the missing wheel.

In some implementations, the activity object 116 may include a visualization marker 124. The visualization marker 124 may include graphical elements that are detectable by the computing device 104 and represent various identification features of the activity object 116. For example, the activity object may be a flip-pad with multiple pages and each page may have a different visualization marker 124 that is unique to that page. The computing device 104 may be able to detect the visualization marker 124 and automatically present a virtual scene 112 that is associated with that page without any input from the user 130.

In some implementations, may include a reference object 118 that may be printed, drawn, molded, projected, or otherwise presented or placed, on the surface of the activity object 116. In some implementations, the reference object 118 may signal to the user 130 what type of tangible interface object 120 to form. For example, the reference object 118a may be a graphic printed on a page of the activity object 116 and the reference object 118a my depict a car body that does not include a top or wheels. The reference object 118a may signal to the user to draw the top and the wheels to complete the car.

In some implementations, the activity object 116 may be integrated with the stand 106 or may be distinct from the stand 106 but placeable adjacent to the stand 106. In some instances, the size of the interactive area on the physical activity scene that includes the activity object 116 may be bounded by the field of view of the video capture device 110 (not shown) and can be adapted by an adapter 108 and/or by adjusting the position of the video capture device 110. In additional examples, the activity object 116 may be a light projection (e.g., pattern, context, shapes, etc.) projected onto the activity surface 102.

The computing device 104 included in the example configuration 100 may be situated on the surface 102 or otherwise proximate to the surface 102. The computing device 104 can provide the user(s) with a virtual portal for displaying the virtual scene 112. For example, the computing device 104 may be placed on a table in front of a user 130 so the user 130 can easily see the computing device 104 while interacting with and/or forming the tangible interface object 120 on the activity object 116. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to a video capture device 110 (also referred to herein as a camera) for capturing a video stream of the physical activity scene. As depicted in FIGS. 1A-1E the video capture device 110 may be a front-facing camera that is equipped with an adapter 108 that adapts the field of view of the camera 110 to include, at least in part, the activity object 116. For clarity, the physical activity scene of the activity surface 102 captured by the video capture device 110 is also interchangeably referred to herein as the activity surface or the activity scene in some implementations.

Figure 1B:
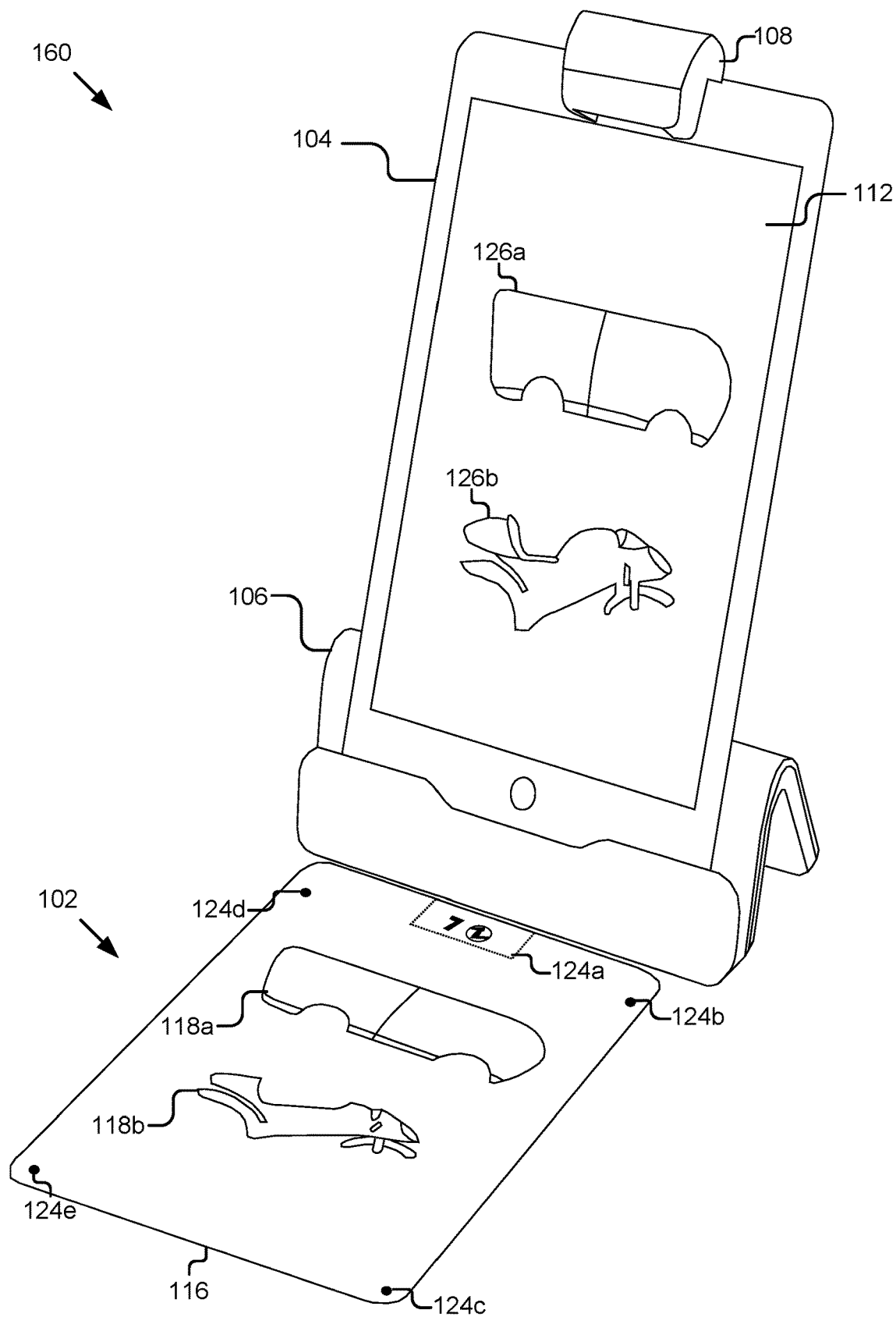
Figure 1C:
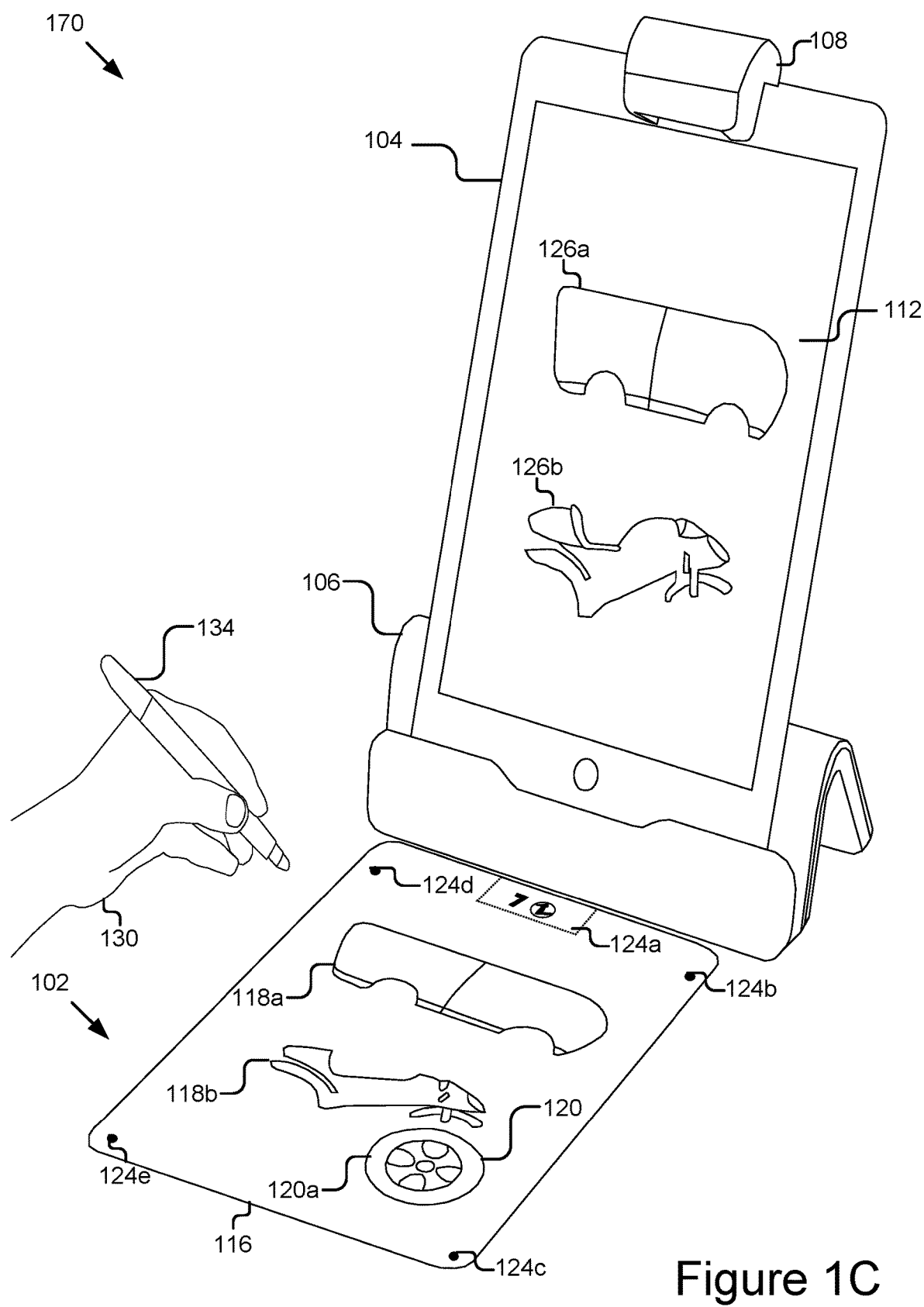

As depicted in FIGS. 1A-1C, the computing device 104 and/or the video capture device 110 may be positioned and/or supported by a stand 106. For instance, the stand 106 may position the display of the computing device 104 in a position that is optimal for viewing and interaction by the user who may be simultaneously forming the tangible interface object 120 and/or interacting with the physical environment (activity object 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the activity object 116, although numerous further implementations are also possible and contemplated. For instance, the camera adapter 108 can split the field of view of the front-facing camera into two scenes. In this example with two scenes, the video capture device 110 captures a physical activity scene that includes a portion of the activity surface 102 and is able to capture the tangible interface object 120 and/or the activity object 116 in either portion of the physical activity scene. In another example, the camera adapter 108 can redirect a rear-facing camera of the computing device (not shown) toward a front-side of the computing device 104 to capture the physical activity scene of the activity surface 102 located in front of the computing device 104. In some implementations, the adapter 108 can define one or more sides of the scene being captured (e.g., top, left, right, with bottom open).

The adapter 108 and stand 106 for a computing device 104 may include a slot for retaining (e.g., receiving, securing, gripping, etc.) an edge of the computing device 104 to cover at least a portion of the camera 110. The adapter 108 may include at least one optical element (e.g., a mirror) to direct the field of view of the camera 110 toward the activity surface 102. The computing device 104 may be placed in and received by a compatibly sized slot formed in a top side of the stand 106. The slot may extend at least partially downward into a main body of the stand 106 at an angle so that when the computing device 104 is secured in the slot, it is angled back for convenient viewing and utilization by its user or users. The stand 106 may include a channel formed perpendicular to and intersecting with the slot. The channel may be configured to receive and secure the adapter 108 when not in use. For example, the adapter 108 may have a tapered shape that is compatible with and configured to be easily placeable in the channel of the stand 106. In some instances, the channel may magnetically secure the adapter 108 in place to prevent the adapter 108 from being easily jarred out of the channel. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display of the computing device 104. The adapter 108 can be detachably connected to the device over the camera 110 to augment the line of sight of the camera 110 so it can capture the activity surface 102 (e.g., surface of a table, etc.). The mirrors and/or lenses in some implementations can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. This mirror reduces the distortive effect of a conventional mirror in a cost effective way.

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110. The adapter 108 could also include optical element(s) that are configured to provide different effects, such as enabling the video capture device 110 to capture a greater portion of the activity surface 102. For example, the adapter 108 may include a convex mirror that provides a fisheye effect to capture a larger portion of the activity surface 102 than would otherwise be capturable by a standard configuration of the video capture device 110.

The video capture device 110 could, in some implementations, be an independent unit that is distinct from the computing device 104 and may be positionable to capture the activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

As shown in the example configuration 100 in FIG. 1A, the activity object 116 may be positioned within a field of view of the video capture device 110. The activity object 116 may include a visualization marker 124 and a reference object 118. In the example, the activity object 116 is a page or sheet of a book, although other configurations are also contemplated for the activity object 116. As shown in the example, visualization marker 124*a* may be located at a top portion of the activity object 116 and the visualization marker 124*a* may include a number, such as a page number, product number, etc. and/or a graphic detectable by the computing device 104. In the example, the graphic represents an icon signaling the type of activity object 116 and the number is a page number of the type of the activity object. In the example, visualization markers 124*b*-124*d* may be detectable by the computing device 104 to identify the activity object 116 and/or identify one or more edges/boundaries of the activity object 116. In the example, the activity object 116 includes a first reference object 118*a* representing a car body and a second reference object 118*b* representing a motorcycle body. Both the car body and the motorcycle are missing elements, such as a wheel and a top. In some implementations, the activity object 116 may include the interaction area 122 where the computing device 104 anticipates that a user 130 will form a tangible interface object 120. By anticipating the areas where the user will form the tangible interface object 120, the computing device 104 can target the interaction area 122 for image processing, rather than processing the entire video stream, which improves the speed of the image processing.

In the example configuration 160 depicted in FIG. 1B, the computing device 104 may use the visualization marker 124 to identify the activity object 116 and has displayed on a graphical user interface embodying the virtual scene 112, a first virtual object 126a and a second virtual object 126b. In the example, the virtual object 126 matches the reference object 118 on the activity object 116 by including an image of a car body and motorcycle body that are lacking components similar to the reference object 118. However, it should be understood that the virtual object 126 may include any images, videos, animations, sounds, etc. that can be displayed in the virtual scene 112 and provide an immersive experience to the user 130. For example, the activity object 116 may be a page of a book and the virtual scene 112 may expand on an illustration presented on the page in the book, etc.

In the example configuration 170 in FIG. 1C, the user 130 may form the tangible interface object 120 on the activity object 116. In some implementations, the user 130 may form the tangible interface object 120 using a formation device 134, such as a pen, pencil, marker, ink, stamp, sticker, paint, knife, etc. While in further implementations, the user 130 may form the tangible interface object 120 without using the formation device 134, such as by attaching objects together, molding an object by hand, etc. In some implementations, the user may form the tangible interface object 120 within the interaction area 122 (not shown). In the example, the user 130 has drawn a tangible interface object 120a that represents a front wheel of the motorcycle depicted by the reference object 118b that was missing a front wheel.

In some implementations, the computing device 104 may capture the formation of the tangible interface object 120a as a step-by-step capture and may provide a visualization of the tangible interface object 120a in substantially real-time that updates as the user updates the formation of the tangible interface object. In further implementations, the computing device 104 may be configured to wait until the formation of the tangible interface object 120 is complete before displaying a virtualization 138 (not shown) of the tangible interface object 120 in the virtual scene 112. The computing device 104 may determine that the formation of the tangible interface object 120 is complete based on no movement in the interaction area 122 for a period of time, an input from the user 130, etc.

Figure 1D:
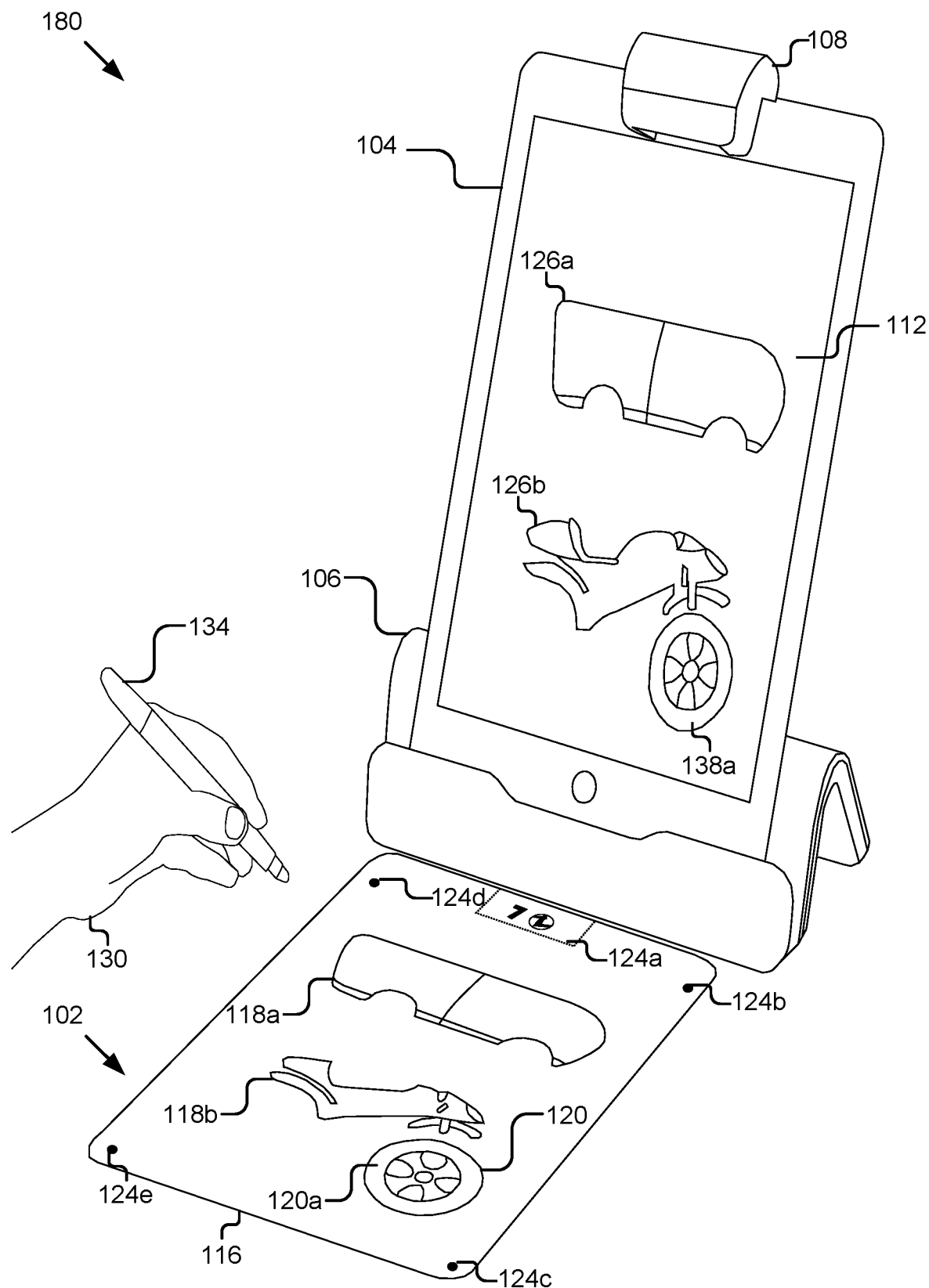

In the example configuration 180 in FIG. 1D, the computing device 104 may generate a virtualization 138a of the formed tangible interface object 120a and may display the virtualization 138a in the virtual scene 112 relative to the virtual object 126b. In some implementations, the computing device 104 may generate the virtualization 138a by detecting a boundary of the tangible interface object 120 and extracting an image of the tangible interface object 120 from the video stream based on the boundary. For example, the tangible interface object 120a is a wheel with an outer boundary that is a circle. The computing device 104 may identify the outer boundary that is the circle by performing line detection and identify the outer boundary from the video stream. In some implementations, the computing device 104 may match pixel colors and extract the image of the tangible interface object 120a by keeping pixel colors that are associated with the tangible interface object 120a and removing pixels that match the color of the activity object 116. By removing the pixels from the outer boundary that do not include the tangible interface object 120a, the computing device 104 can extract an image of the tangible interface object 120a that only depicts the tangible interface object 120a.

In some implementations, the computing device 104 may match the boundary of the extracted image of the tangible interface object 120 with a portion of the virtual object 126. For example, if the virtual object 126 depicts a portion of a character and the character does not include a hand, the user 130 can form a tangible interface object 120 to represent a hand on the activity object 116 and the computing device 104 can generate a virtualization 138 of the hand, such as by extracting an image of the tangible interface object 120 formed by the user. The computing device 104 may then match the location of the virtualization 138 of the hand with the virtual object 126 of the portion of the character where a hand would go. The computing device 104 may match up the lines of the virtual object 126 and the virtualization 138 to create a character that has a hand where the lines from the virtual object 126 merge with the lines of the virtualization 138. In some implementations, matching the lines may involve resizing, rotating, trimming, cleaning up, or other image processing of the extracted image in order to match the lines. This allows for a user to form almost limitless types of tangible interface objects 120 and not be constrained to only form tangible interface objects 120 to a specific form that the computing device 104 can process.

Figure 1E:
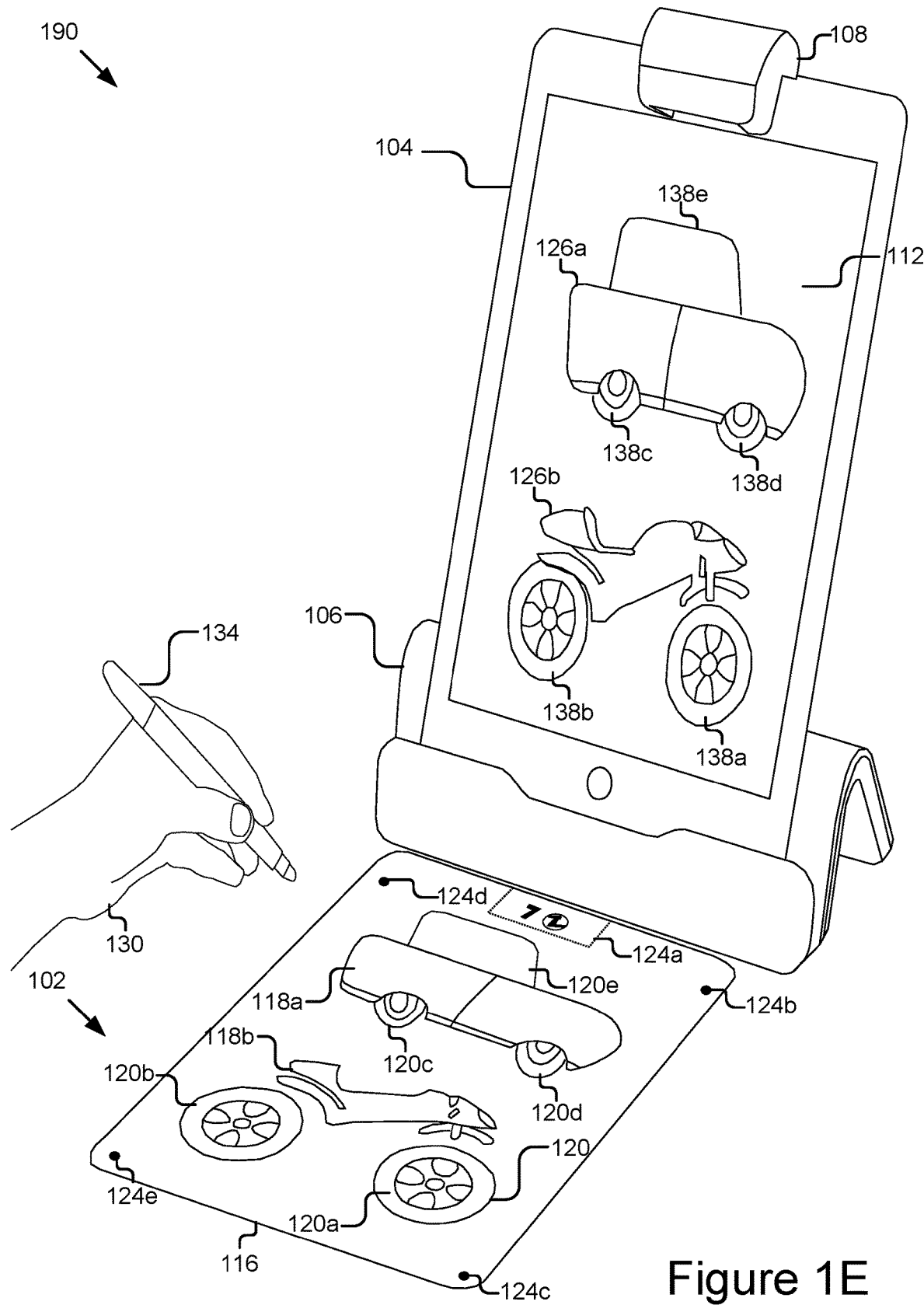

In the example configuration 190 in FIG. 1E, the user 130 has formed additional tangible interface objects 120b-120e representing a rear motorcycle wheel, rear car wheel, front car wheel, and car top respectively. As described with respect to FIG. 1D, the computing device 104 may detect the formation of each of the tangible interface objects 120b-120e and may generate corresponding virtualizations 138b-138e that are displayed in the virtual scene 112 relative to the virtual objects 126a and 126b. It should be understood that any number of tangible interface objects 120 may be formed and any number of virtualizations 138 may be generated beyond the examples described with respect to FIGS. 1A-1E. In some implementations, responsive to a virtualization 138 being displayed, or responsive to an animation criteria being met, the virtual scene 112 may execute a routine based on the virtualization 138. In some implementations, the animation criteria may include completing a portion of the virtual object 126 by adding the virtualizations 138. For example, the virtual object 126b depicting the motorcycle was missing both the front and the rear wheel. The tangible interface objects 120a and 102b formed front and rear wheels. Responsive to the virtualizations 138a and 138b being presented and matched to the virtual object 126b, the computing device 104 may determine the animation criteria of having two wheels have been met and a routine that includes the motorcycle with both wheels may be executed in the virtual scene 112.

Figure 2:
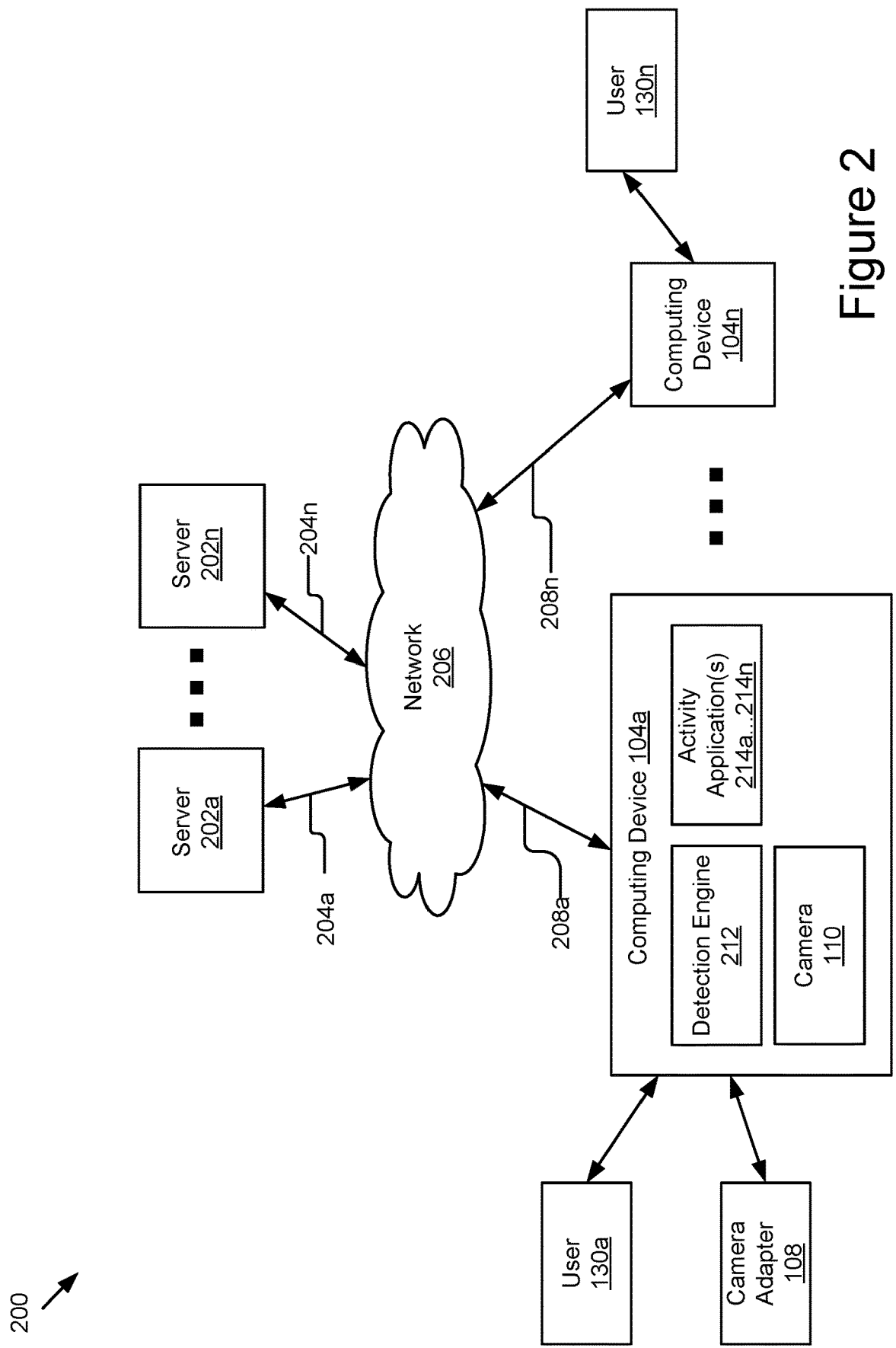
FIG. 2 is a block diagram illustrating an example computer system for detection and visualization of a formation of a tangible interface object.

FIG. 2 is a block diagram illustrating an example computer system 200 for detecting and visualization of a formation of a tangible interface object 120. The illustrated system 200 includes computing devices 104a . . . 104n (also referred to individually and collectively as 104) and servers 202a . . . 202n (also referred to individually and collectively as 202), which are communicatively coupled via a network 206 for interaction with one another. For example, the computing devices 104a . . . 104n may be respectively coupled to the network 206 via signal lines 208a . . . 208n and may be accessed by users 130a . . . 130n (also referred to individually and collectively as 130). The servers 202a . . . 202n may be coupled to the network 206 via signal lines 204a . . . 204n, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 104a . . . 104n (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104a . . . 104n may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104a . . . 104n may be the same or different types of computing devices.

As depicted in FIG. 2, one or more of the computing devices 104a . . . 104n may include a camera 110, a detection engine 212, and activity application(s) 214. One or more of the computing devices 104 and/or cameras 110 may also be equipped with an adapter 108 as discussed elsewhere herein. The detection engine 212 is capable of detecting and/or recognizing the formation and/or location of a tangible interface object 120 or a visualization marker 124 on the activity object 116 (e.g., on the activity surface 102 within field of view of camera 110). The detection engine 212 can detect the position and orientation of the tangible interface object 120 in physical space, detect how the tangible interface object 120 is being formed and/or manipulated by the user 130, and cooperate with the activity application(s) 214 to provide users 130 with a rich virtual experience by detecting an formation of the tangible interface object 120 and generating a virtualization 138 in the virtual scene 112.

In some implementations, the detection engine 212 processes video captured by a camera 110 to detect formation of the tangible interface object 120 and/or the visualization marker 124. The activity application(s) 214 are capable of determining a tangible interface object 120 and generating a virtualization 138 of the tangible interface object 120. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/ or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into a single computing device or system or additional computing devices or systems, etc.

Figure 3:
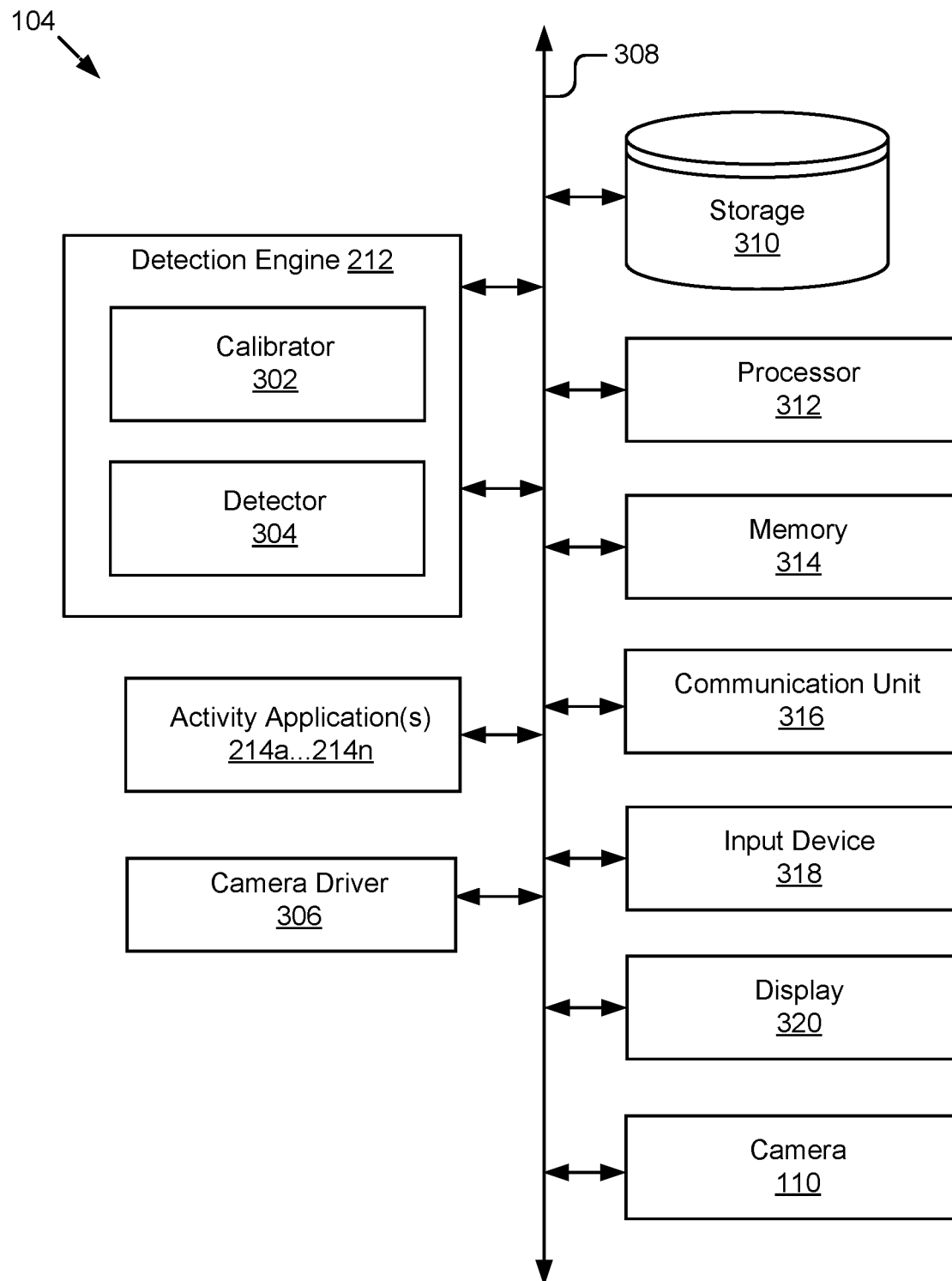
FIG. 3 is a block diagram illustrating an example computing device.

FIG. 3 is a block diagram of an example computing device 104. As depicted, the computing device 104 may include a processor 312, memory 314, communication unit 316, display 320, camera 110, and an input device 318, which are communicatively coupled by a communications bus 308. However, it should be understood that the computing device 104 is not limited to such and may include other elements, including, for example, those discussed with reference to the computing devices 104 in FIGS. 1A-1E and 2.

The processor 312 may execute software instructions by performing various input/output, logical, and/or mathematical operations. The processor 312 has various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other elements of the computing device 104. In some implementations, the memory 314 may store instructions and/or data that may be executed by the processor 312. For example, the memory 314 may store the detection engine 212, the activity application(s) 214, and the camera driver 306. The memory 314 is also capable of storing other instructions and data, including, for example, an operating system, hardware drivers, other software applications, data, etc. The memory 314 may be coupled to the bus 308 for communication with the processor 312 and the other elements of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 320 may display electronic images and data output by the computing device 104 for presentation to a user 130. The display 320 may include any conventional display device, monitor or screen, including, for example, an organic light-emitting diode (OLED) display, a liquid crystal display (LCD), etc. In some implementations, the display 320 may be a touch-screen display capable of receiving input from one or more fingers of a user 130. For example, the display 320 may be a capacitive touch-screen display capable of detecting and interpreting multiple points of contact with the display surface. In some implementations, the computing device 104 may include a graphics adapter (not shown) for rendering and outputting the images and data for presentation on display 320. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 130. For instance, the functionality of the input device 318 and the display 320 may be integrated, and a user 130 of the computing device 104 may interact with the computing device 104 by contacting a surface of the display 320 using one or more fingers. In this example, the user 130 could interact with an emulated (i.e., virtual or soft) keyboard displayed on the touch-screen display 320 by using fingers to contact the display 320 in the keyboard regions.

The detection engine 212 may include a detector 304. The elements 212 and 304 may be communicatively coupled by the bus 308 and/or the processor 312 to one another and/or the other elements 214, 306, 310, 314, 316, 318, 320, and/or 110 of the computing device 104. In some implementations, one or more of the elements 212 and 304 are sets of instructions executable by the processor 312 to provide their functionality. In some implementations, one or more of the elements 212 and 304 are stored in the memory 314 of the computing device 104 and are accessible and executable by the processor 312 to provide their functionality. In any of the foregoing implementations, these components 212, and 304 may be adapted for cooperation and communication with the processor 312 and other elements of the computing device 104.

The detector 304 includes software and/or logic for processing the video stream captured by the camera 110 to detect tangible interface object 120, an activity object 116, and/or a visualization marker 124 included in the video stream. In some implementations, the detector 304 may identify line segments related to tangible interface object 120 and/or visualization markers 124 included on the activity object 116. In some implementations, the detector 304 may be coupled to and receive the video stream from the camera 110, the camera driver 306, and/or the memory 314. In some implementations, the detector 304 may process the images of the video stream to determine positional information for the line segments related to the tangible interface object 120 and/or formation of a tangible interface object 120 on the activity object 116 (e.g., location and/or orientation of the line segments in 2D or 3D space) and then analyze characteristics of the line segments included in the video stream to determine the identities and/or additional attributes of the line segments.

In some implementations, the detector 304 may use the visualization markers 124b-124d to recognize custom designed portions of the activity object 116, such as corners of a page, etc. The detector 304 may perform a straight line detection algorithm and a rigid transformation to account for distortion and/or bends on the activity object 116. In some implementations, the detector 304 may match features of detected line segments to a reference page that may include a depiction of the reference object 118 in order to determine the line segments and/or the boundary of the tangible interface object 120. In some implementations, the detector 304 may account gaps and/or holes in the detected line segments and/or contours and may be configured to generate a mask to fill in the gaps and/or holes.

In some implementations, the detector 304 may recognize the line by identifying its contours. The detector 304 may also identify various attributes of the line, such as colors, contrasting colors, depth, texture, etc. In some implementations, the detector 304 may use the description of the line and the lines attributes to identify the tangible interface object 120 by comparing the description and attributes to a database of objects and identifying the closest matches.

The detector 304 may be coupled to the storage 310 via the bus 308 to store, retrieve, and otherwise manipulate data stored therein. For example, the detector 304 may query the storage 310 for data matching any line segments that it has determined are present in the activity object 116. In all of the above descriptions, the detector 304 may send the detected images to the detection engine 212 and the detection engine 212 may perform the above described features.

The detector 304 may be able to process the video stream to detect an interaction between the activity object 116 and a tangible interface object 120. In some implementations, the detector 304 may be configured to understand relational aspects between the tangible interface object 120 and determine an interaction based on the relational aspects. For example, the detector 304 may be configured to identify an interaction related to one or more tangible interface object 120 present in the activity object 116 and the activity application(s) 214 may determine a routine based on the relational aspects between the more tangible interface object 120 and other elements of the activity object 116.

The activity application(s) 214 include software and/or logic for receiving a detected formation of a tangible interface object 120 and/or an identity or type of the activity object 116, determining a virtual object 126, and generate a virtualization 138 based on the formation of the tangible interface object 120. The activity application(s) 214 may be coupled to the detector 304 via the processor 312 and/or the bus 308 to receive the information. For example, a user 130 may draw a tangible interface object 120 representing a bag of money on the activity object 116 and the activity application(s) 214 may generate and display a virtualization 138 of the bag of money.

In some implementations, the activity application(s) 214 may determine the virtual object 126 and or a routine by searching through a database of virtual objects 126 and/or routines that are compatible with the detected interaction. In some implementations, the activity application(s) 214 may access a database of virtual objects 126 stored in the storage 310 of the computing device 104. In further implementations, the activity application(s) 214 may access a server 202 to search for virtual objects 126 and/or routines. In some implementations, a user 130 may predefine a virtual object 126 to include in the database of virtual objects 126.

In some implementations, the activity application(s) 214 may enhance the virtual scene and/or the virtualization 122 as part of the virtual response. For example, the activity application(s) 214 may display visual enhancements as part of executing the virtual response. The visual enhancements may include adding color, extra virtualizations, background scenery, etc. In further implementations, the visual enhancements may include having the virtualization 138 move or interact with another virtualization (not shown) and/or the virtual object 126 in the virtual scene. In some implementations, the activity application(s) 214 may prompt the user 130 to select one or more enhancement options, such as a change to color, size, shape, etc. and the activity application(s) 214 may incorporate the selected enhancement options into the virtualization 138.

In some instances, the manipulation of the tangible interface object 120 by the user 130 in the physical activity scene may be incrementally presented in the virtual scene 112 as the user 130 manipulates the tangible interface object 120. Non-limiting examples of the activity applications 214 may include video games, learning applications, assistive applications, storyboard applications, collaborative applications, productivity applications, etc.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other elements of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some implementations, the processor of the camera 110 may be coupled via the bus 308 to store video and/or still image data in the memory 314 and/or provide the video and/or still image data to other elements of the computing device 104, such as the detection engine 212 and/or activity application(s) 214.

The storage 310 is an information source for storing and providing access to stored data, such as a database of virtual objects 126, gallery(ies) of virtual objects 126 that may be displayed on the display 320, user profile information, community developed virtual routines, virtual enhancements, etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the storage 310 is discussed elsewhere herein.

Figure 4:
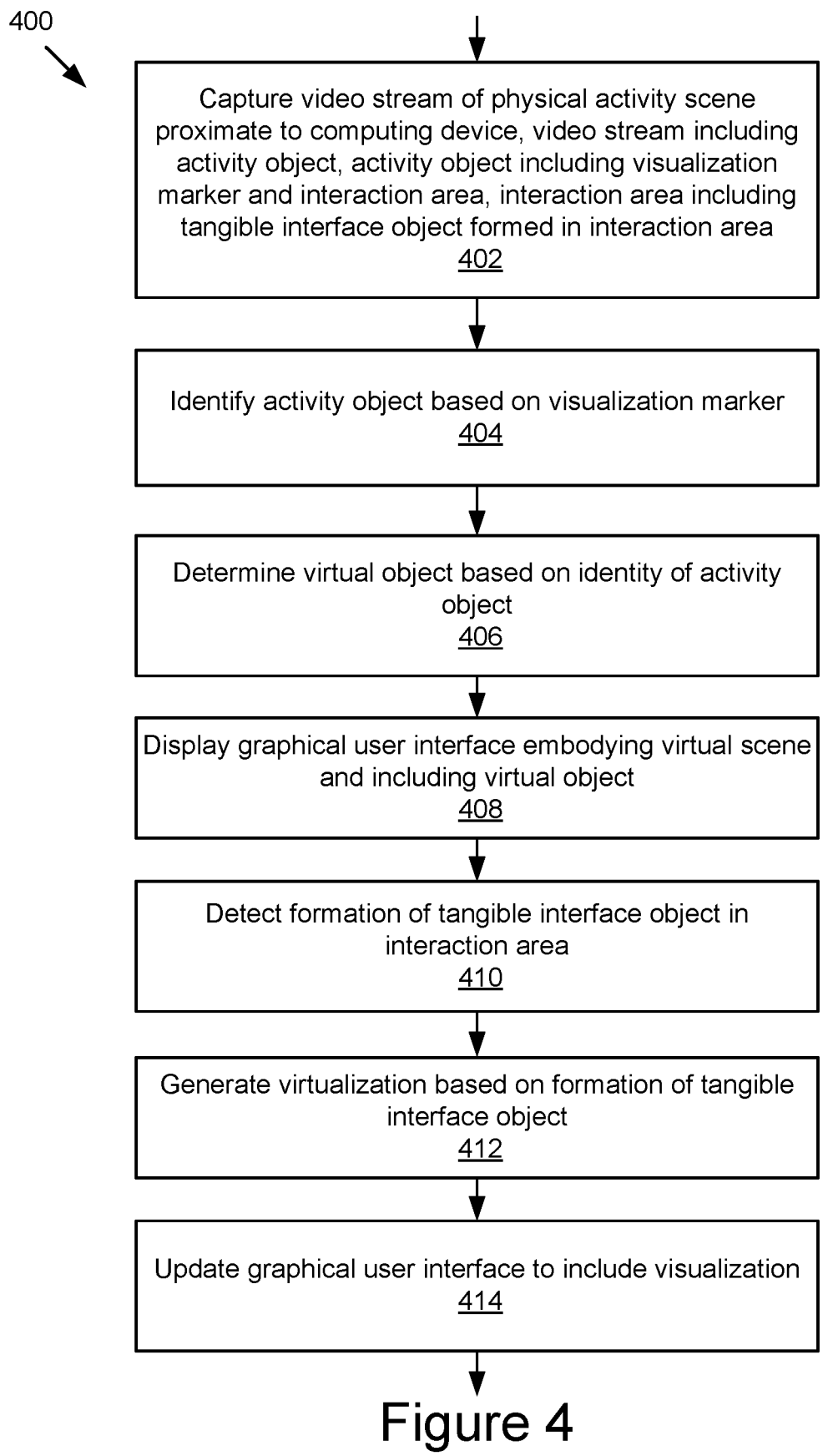
FIG. 4 is a flowchart of an example method for detection and visualization of a formation of a tangible interface object.

FIG. 4 is a flowchart of an example method 400 for detection and visualization of a formation of a tangible interface object 120. At 402, the video capture device captures a video stream of a physical activity scene proximate to the computing device 104, the video stream including an activity object 116, the activity object including a visualization marker 124 and an interaction area 122, the interaction area 122 including a tangible interface object 120 formed in the interaction area 122.

At 404, the processor of the computing device 104 may identify the activity object 116 based on the visualization marker 124. As described elsewhere herein, the visualization marker 124 may include unique characteristics that the detector 304 may be able to detect and identify as being associated with a specific type of activity object 116, such as a page of a book, a specific object, etc.

At 406, the processor of the computing device, may determine a virtual object 126 based on the identity of the activity object 116. For example, if the activity object 116 is a book representing superheroes and the specific page represents a specific superhero, then the virtual object 126 may be a graphical representation of that super hero present on the activity object 116. At 408, the display of the computing device may display a graphical user interface embodying a virtual scene 112. In some implementations, the virtual scene 112 may include the virtual object 126.

At 410, the detector 304 may detect a formation of the tangible interface object 120 in the interaction area 122. The formation of the tangible interface object 120 may be a drawing by a user 130. A drawing may include a pencil drawing, a pen drawing, a marker drawing, a painting, a stamp, a clay formation, connecting one or more blocks and/or building objects, etc. The detector 304 may detect the formation of the tangible interface object 120 using standard image processing techniques a described elsewhere herein.

At 412, the processor of the computing device 104 may generate a virtualization 138 based on the formation of the tangible interface object 120. In some implementations, generating the virtualization 138 may include extracting an image of the tangible interface object 120 from the video stream, such as by determining a boundary of the image and extracting everything within the boundary, cleaning up the image using image processing techniques, and matching the image to the virtual scene 112. At 414, the display of the computing device may update the graphical user interface to include the virtualization 138 presented in the virtual scene 112.

Figure 5:
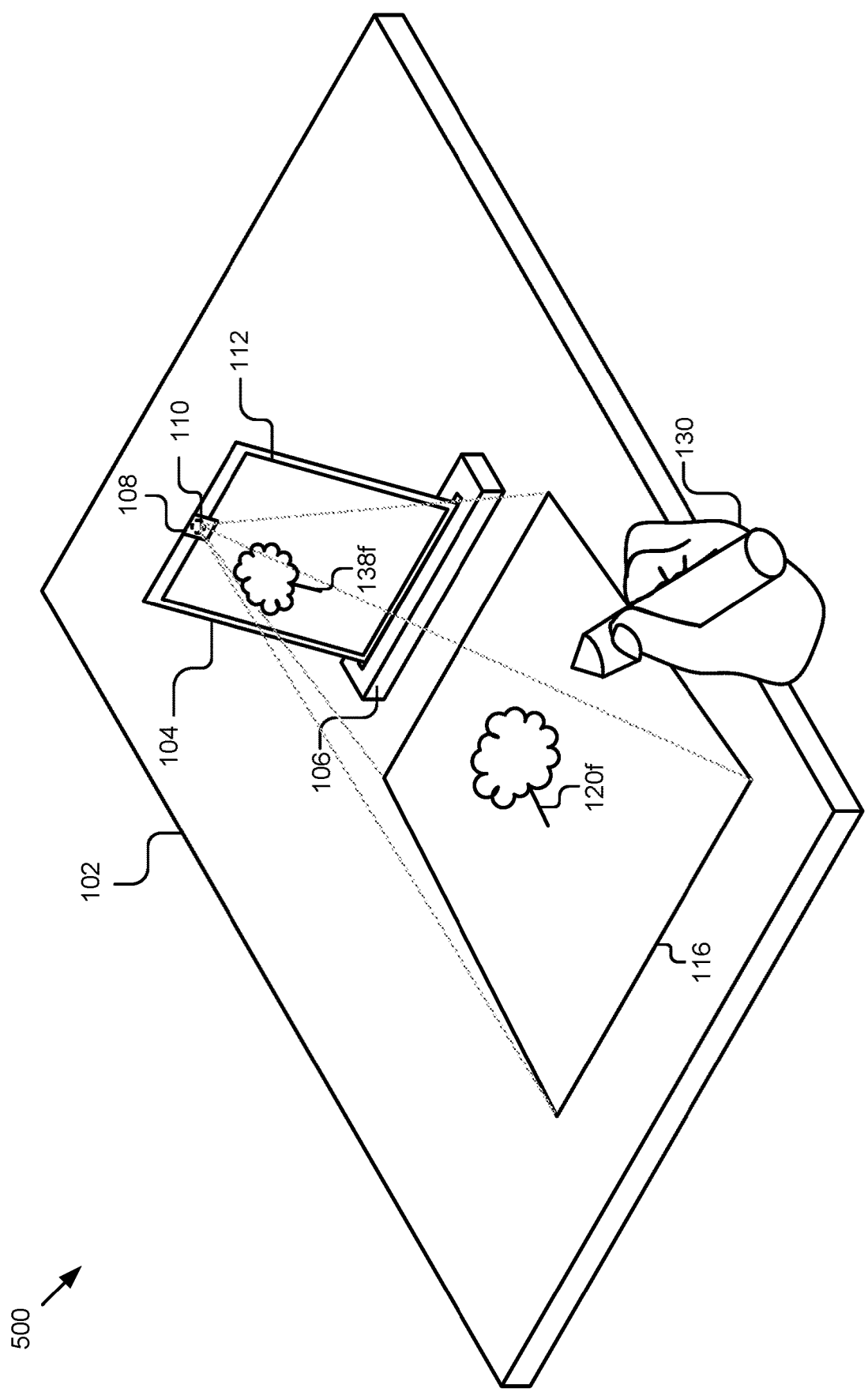
FIG. 5 is another example configuration of a visualization platform for detection and visualization of a formation of a tangible interface object.

FIG. 5 is a graphical representation 500 illustrating an example physical activity scene. In the example, tangible interface object 120f represent a drawing of a tree on the activity object 116 that is detectable by the detection engine 212. The virtualization 138f represents a digital representation of the drawing of the tree in the virtual scene 112. As shown in the example, the user 130 may form the tangible interface object 120f and the computing device 104 may cause a virtualization 138f of the formed tangible interface object 120f to be displayed in the virtual scene 112.

Figure 6:
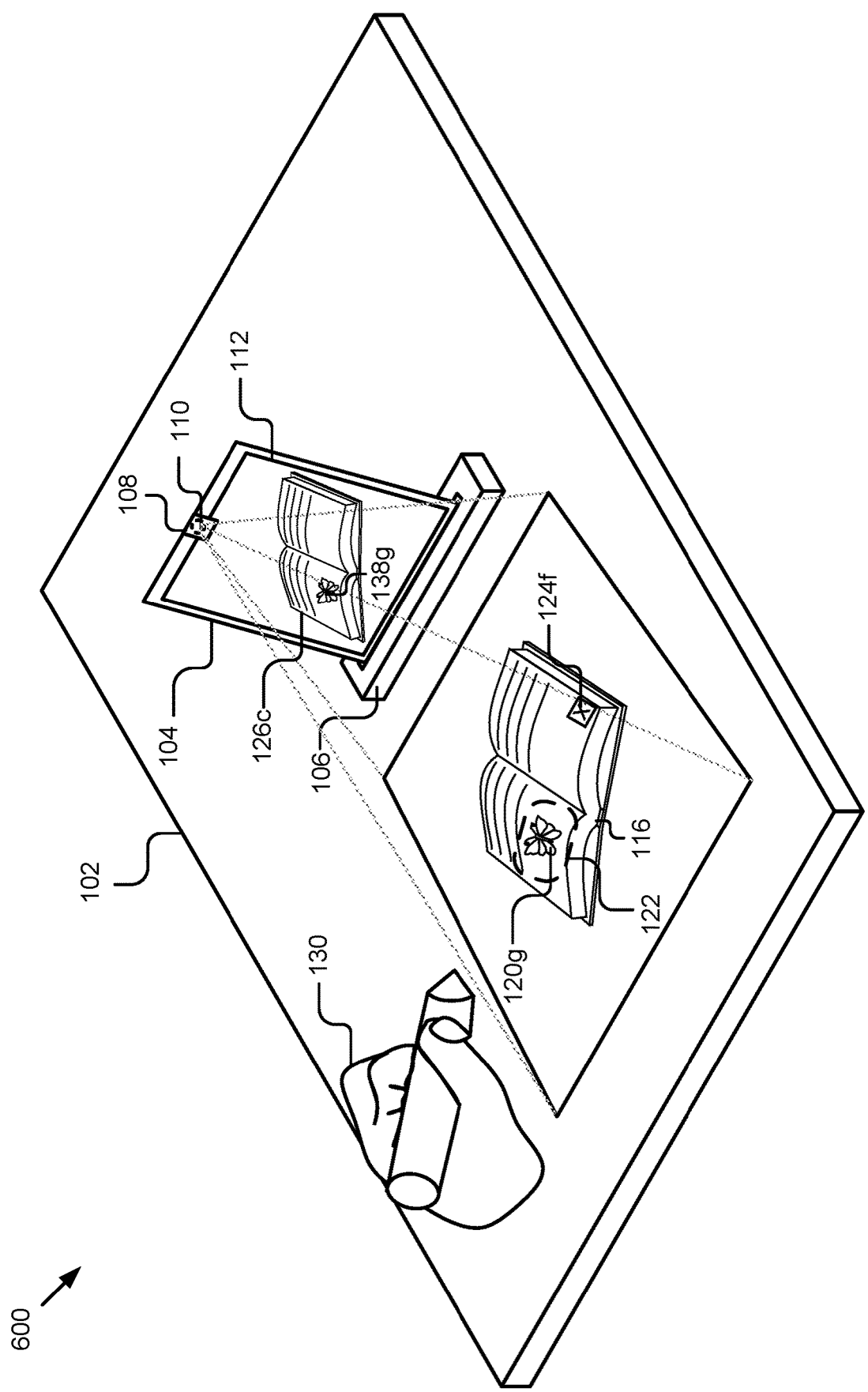
FIG. 6 is another example configuration of a visualization platform for detection and visualization of a formation of a tangible interface object.

FIG. 6 is a graphical representation 600 illustrating an example activity object 116 representing book. In some implementations, the activity object 116 representing the book may include a visualization marker 124f that may be used by the detection engine 212 to identify the page of the book and/or determine an orientation of the book. The visualization marker 124f may be used to perform page tracking by the detection engine 212. The page tracking may allow the detection engine 212 to identify the contents of the book and display one or more virtual objects 126c related to the page of the book in the virtual scene 112. In some implementations, the page tracking may correct any keystoning and/or orientation deviations introduced by the book being askew based on the detected visualization marker 124f. In further implementations, the detection engine 212 may identify the visualization marker 124f and the activity application(s) 214 may retrieve a virtual object 126c from storage 310 based on the detected visualization marker 124f. In some implementations, the detection engine 212 may search for the visualization marker 124f before the virtual object 126c is displayed in the virtual scene 112 and if the visualization marker 124f is not detected, then the activity application(s) 214 may not execute applications in the virtual scene 112.

In some implementations, a user 130 may form a tangible interface object 120g within a page of the book as shown in FIG. 6. The detection engine 212 may track the formation of the tangible interface object 120g and cause the activity application(s) 214 to generate a virtualization 138g within the virtual scene 112 based on the formation of the tangible interface object 120g. In some implementations, the formation of the tangible interface object 120g may include a drawing of an image, a placement of a token/sticker/block/object, a interaction with a graphic embedded into the page, etc. For example, a user 130 may place a butterfly sticker into the interaction area 122 on the activity object 116 and a virtualization 138g of the butterfly sticker may be displayed in the virtual scene.

Figure 7A:
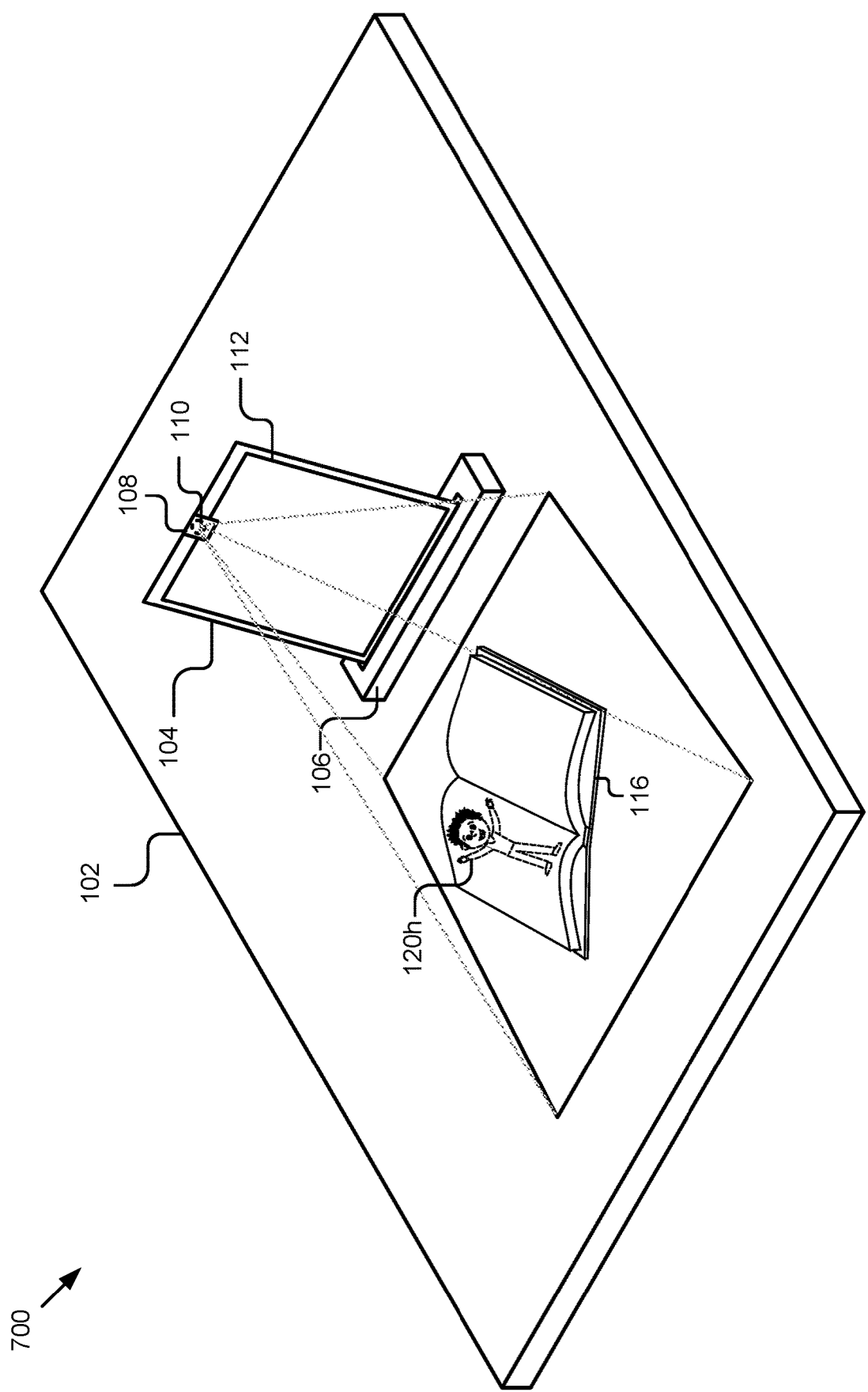
FIGS. 7A-7C are example configurations of a visualization platform for detection and visualization of a formation of a tangible interface object.
Figure 7B:
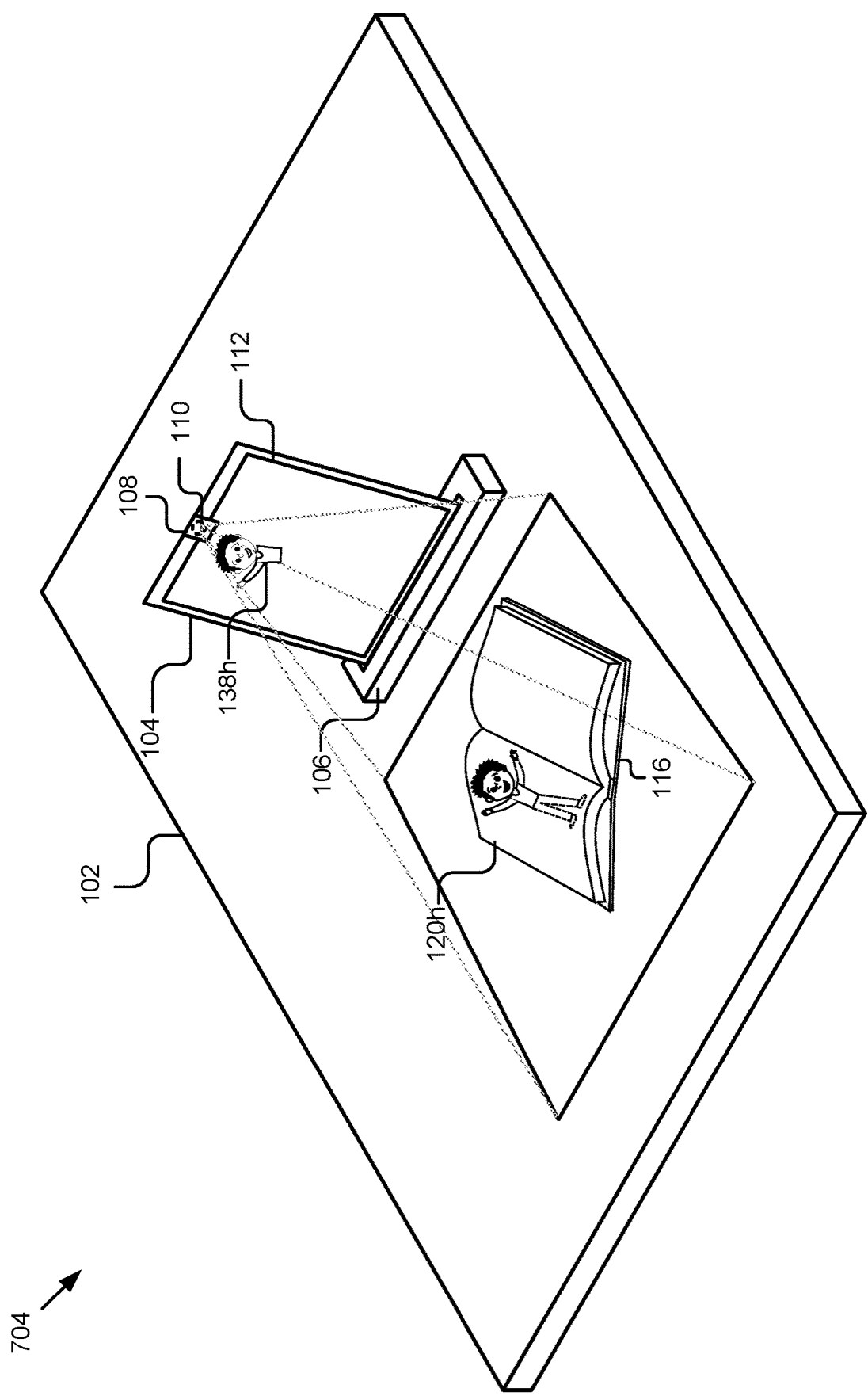
Figure 7C:
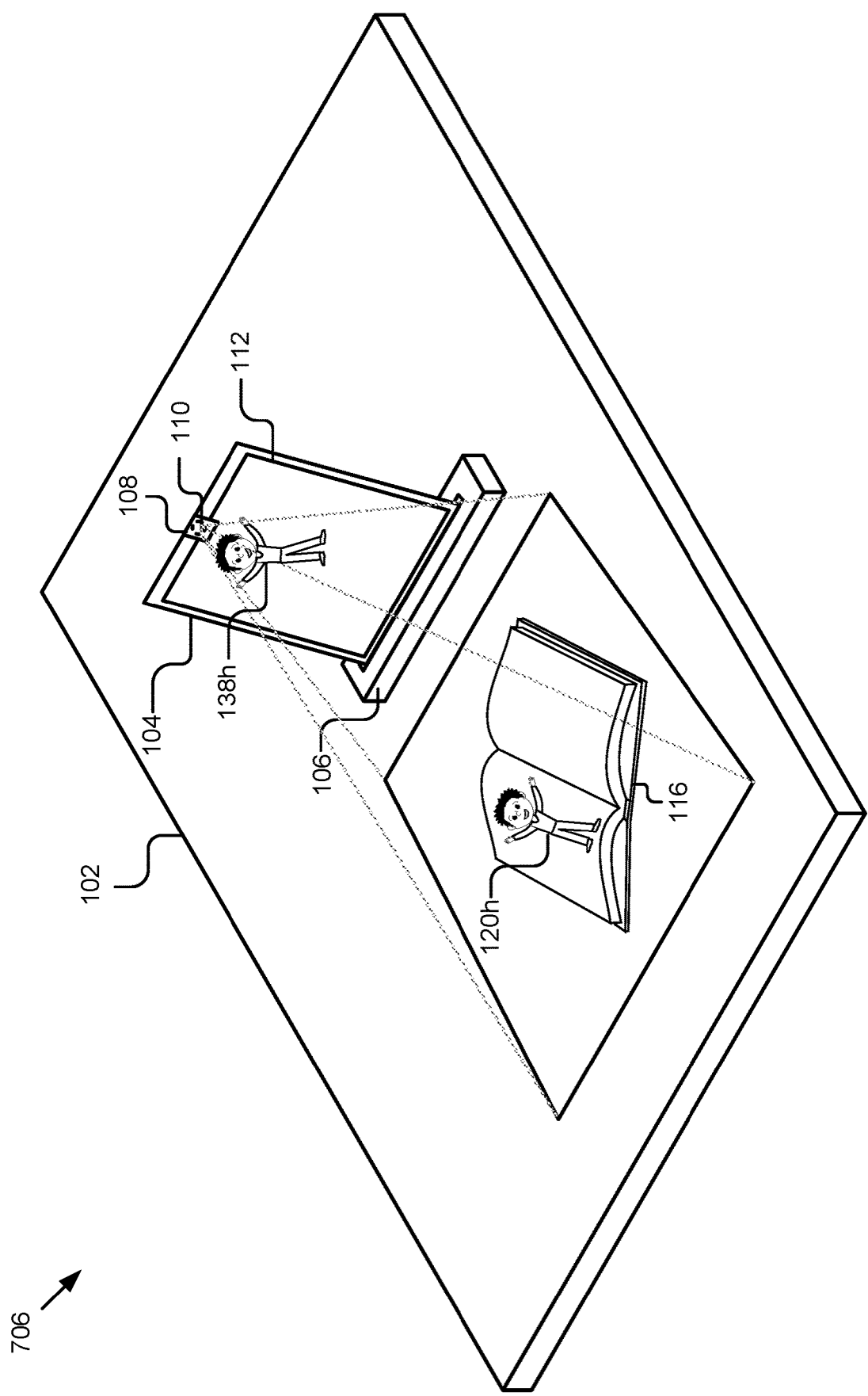

FIGS. 7A-7C are example configurations of a visualization platform for detection and virtualization of a formation of a tangible interface object. FIG. 7A depicts a graphical representation 700 depicting an activity object 116 that includes tangible interface object 120h that represents a character drawing template. In some implementations, the character drawing template may be a template of a character that can be presented in the virtual scene 112 as the user 130 creates the character on the activity object 116. In some implementations, the character drawing template may be a drawing on a sheet of paper and/or page of a book, an erasable drawing on a whiteboard, a printable image that may be placed in the physical activity scene 116, a projectable image, a physical object, etc.

As shown in FIG. 7A, the tangible interface object 120h of the character drawing template may be depicted in broken lines representing an outline of the character for the user to fill in and form the character. In some implementations, a user 130 may fill in the broken line areas of the character drawing template in order to create a custom virtual character represented as a virtualization 138h. For example, a user 130 may add a specific color to a portion of the character drawing template and the virtual character represented as a virtualization 138h (not shown) will include the specific color on the specific portion of the virtual character represented as a virtualization 138h (not shown) that relates to the portion of the character drawing template that the user 130 altered. In some implementations, the drawing template may be included within an interaction area 122 and the interaction area 122 may include the outline of the tangible interface object 120h representing the character template.

FIG. 7B depicts an example configuration 704 that includes the tangible interface object 120h of the character drawing template that is partially formed (drawn, built, molded, etc.) by the user 130. The detection engine 212 may detect the partially created portion of the character drawing template and cause the activity application(s) 214 to generate the virtualization 138h that reflects the partially drawn portion of the character drawing template. The partially created character drawing template may include color changes, different poses, changes in the presentations such as hair style and facial features, changes in clothing and/or accessories, etc.

FIG. 11C depicts an example configuration 706 that includes the tangible interface object 120h of the character drawing template that is completed by the user 130. The detection engine 212 may detect the completed character drawing template and cause the activity application(s) 214 to generate a full virtualization 138h that reflects the completed character drawing template. In some implementations, in response to the detection engine 212 detecting a completed character drawing template, the activity application(s) 214 may further populate the virtual scene 112 to include additional enhancements, such as environmental surroundings, additional characters and/or accessories, etc. In some implementations, the activity application(s) 214 may perform complex matching algorithms to match specific enhancements to the completed virtual character 1138h based on the completed character drawing template 1102c, such as matching complementary colors, populating a virtual scene 112 based on clothing choices, etc. In further implementations, the activity application(s) 214 and or the detector 304 may perform masking to fill in any gaps in the virtualization 138h where the drawing of the character drawing template may not have been fully completed. In further implementations, the activity application(s) 214 may match separate portions of the character drawing template together or with a virtual object 126 (not shown) in order to match lines of the separate components and create a uniform virtualization 138h.

In some implementations, the character drawing template may allow the user 130 to create different poses for the character. For example, the characters body may be displayed without arms and/or legs and the user 130 can create arms and or legs in any pose and style by forming a drawing representing the tangible interface object 120h of those arms and/or legs in a pose. The activity application(s) 214 may then add the created arms and/or legs to the virtualization 138h to allow for various poses. This would allow a user 130 to create a virtual story and illustrate the poses, facial expressions, interactions, etc. of the virtualization 138h based on specific poses and drawings created using the character drawing template. In further implementations, the character drawing template may include different perspective views of a character's body template and the user may be able to create features for specific views and the activity application(s) 214 may then merge the various views to generate a virtualization 138h based on the combined created perspective views.

In some implementations, the activity object 116 may be a drawing board that can be positioned adjacent to the stand 106. The drawing board may be at least partially covered in a writing surface such as a dry erase board or chalkboard. The drawing board may include side edges that protrude past a top edge and are configured to receive and wrap around an edge of the stand 106. In further implementations, the top edge and/or side edge protrusions may be configured to couple with the edge of the stand 106, such as via a magnetic or similar coupling. The drawing board may include a rubber exterior edge that keeps the drawing board from sliding on the activity surface 102.

Figure 8:
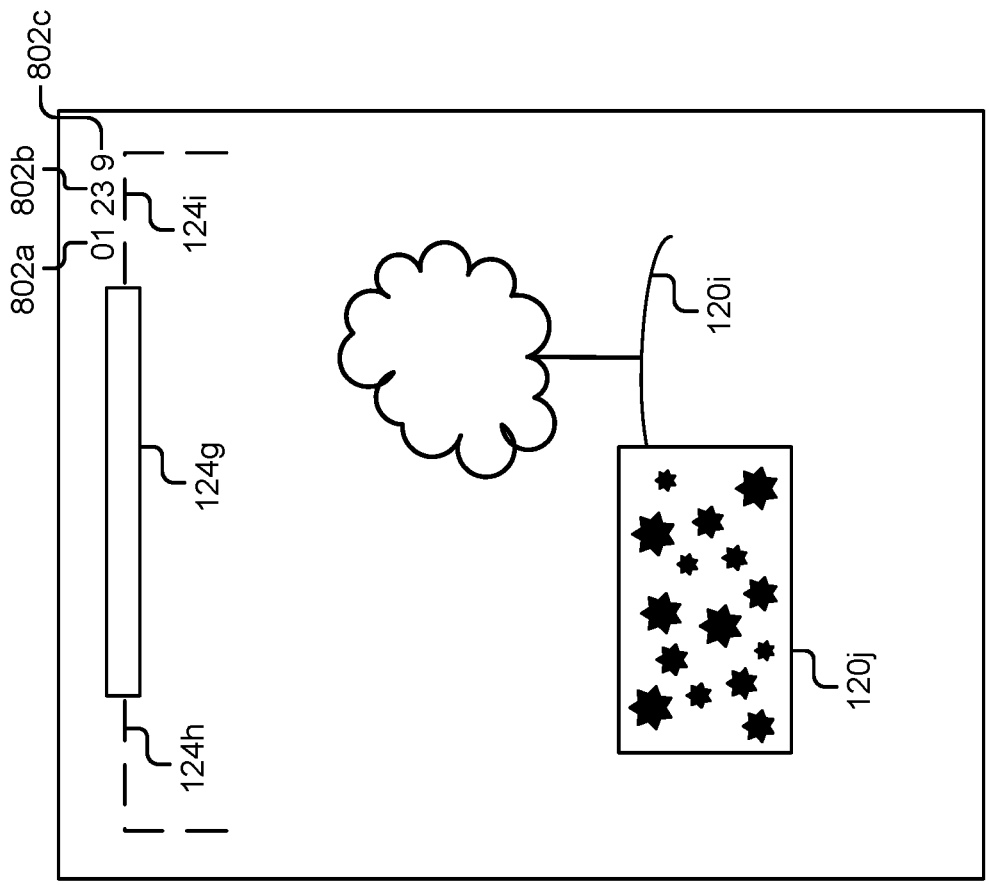
FIG. 8 is an example configuration of an activity object.

FIG. 8 is an example configuration of the activity object 116. As shown, the activity object 116 may represent a page, such as a page of a drawing book, notepad, book, flip pad, etc. The page may include the visualization markers 124g-124i. The visualization markers 124g-124i may be placed on an outer portion of the page. The visualization markers 124g-124i may be processed by the detection engine 212 to determine an orientation of the page, such that the page, or tangible interface objects 120i-102j formed on the page, such as by drawing, may be presented in the virtual scene 112 (not shown) in a desirable way. For example, the detection engine 212 may orient the work right-side-up even though the work may be drawn with the page askew relative to the display 302. In cases where a user may be creating a drawing based on a digital template depicted in the virtual scene (e.g., tracing a drawing), this can advantageously allow the activity application 214 to keep the drawing being created and reflected in the image stream captured by the camera aligned with the digital template. For instance, the detection engine 212 may correct the orientation of the drawing based on the markers, which may reflect the position of the page 1310 relative to the known boundaries of the field of view of the camera.

In some embodiments, the portions of the page lying beyond the visualization markers 124h and 124i may be ignored by the detection engine 212 and/or activity application 214 when processing the tangible interface objects 120i-120j from the page. In some implementations, the visualization markers 124h and 124i may denote the interaction area 122 (not shown) and the detector 304 may process the area within the boundaries formed by the visualization markers 124h and 124i in order to detect a formation of the tangible interface objects 120i and 120j. In further implementations, the detection engine 212 may detect when the formation of the tangible interface objects 120 exceeds the interaction area 122 and in some implementations may ignore portions of the tangible interface object 120 that exceed the interaction area. In further implementations, the detection engine 212 may still detect the formation of the tangible interface object 120 when it exceeds the boundary and the activity application(s) 214 may still extract the entire tangible interface object 120 including the portion that exceeds the interaction area 122.

In some implementations, unique identifying markers 802 may be preprinted on the pages that comprise the book. While the page is shown as including three unique identifying markers 802l-802c, one or more unique identifying markers 802 may be included depending on the configuration. The markers may have any suitable configuration for identifying a type or identity of the page. In some implementations, the unique identifying markers 802 can be processed by the detection engine 212 and used to identify the page. The page may be a unique page within the book, may belong to a class of pages that comprise at least a portion of the book, or may belong to a class of pages that are associated with a particular activity or other suitable type. The activity application(s) 214 can query the storage 310 for pre-stored data describing the specific book, the type of book, the type of page, the specific page, etc. In some cases, the activity application(s) 214 can store image(s) of the tangible interface object 120 and/or its formation with respect to the page using the identifier processed from the unique identifying markers 802. Further examples of markers may include a character string (e.g., series of letters and numbers, etc.), a bar code, a QR code, or other suitable markers, and standard processing techniques for determining the identifier may be used to process the marker to determine the identifier for the page 1310. In some embodiments, a unique banner (e.g., 1408) of the book and/or page may be used to identify the page and/or may serve as an orientation marker.

In some implementations, the tangible interface object 120 may be a token placed on the page. One or more tokens may be placed by the user in the activity object 116, such as on the page, to enhance the activity object 116 being created in the physical activity scene. The token may comprise physical (e.g., collectible) objects that can be placed in the physical activity scene, on top of the work (e.g., a sketch), to affect the result depicted in the virtual scene, such as but not limited to adding an effect or a filter in real-time to the digital version of the work. In some cases, tokens can be combined to yield even more enhanced (e.g., interesting) effects. The form factor of the token(s) may vary depending on the use case. For example, a token may comprise a card, and different types of cards could yield different effects within the digital scene relative to the digital version of the work. By way of non-limiting example, as shown in FIG. 8, the token may be represented as tangible interface object 120j and may be placed on the sketch represented as the tangible interface object 120i of a tree to add a starry look.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) tangible interface object(s) 120 and/or an interaction simultaneously without overwhelming the computing device, recognizing tangible interface object(s) 120 and/or an interaction (e.g., such as a wand 128 interacting with the physical activity scene 116) with substantially perfect recall and precision (e.g., 99% and 99.5%, respectively), being capable of adapting to lighting changes and wear and imperfections in tangible interface object(s) 120, providing a collaborative tangible experience between users in disparate locations, being intuitive to setup and use even for young users (e.g., 3+ years old), being natural and intuitive to use, and requiring few or no constraints on the types of tangible interface object(s) 120 that can be processed.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   capturing, using a video capture device associated with a computing device, a video stream of a physical activity scene, the video stream including an activity object, the activity object including a visualization marker, a reference object depicting a type of a tangible interface object to form, and an interaction area, the interaction area including the tangible interface object formed in the interaction area based on the type of the tangible interface object depicted by the reference object;
   identifying, using a processor of the computing device, the activity object based on the visualization marker;
   determining, using the processor of the computing device, a virtual object based on the identity of the activity object;
   displaying, on a display of the computing device, a graphical user interface embodying a virtual scene, the virtual scene including the virtual object;
   detecting, using the processor of the computing device, a formation of the tangible interface object in the interaction area by:
      detecting a line segment of the tangible interface object;
      matching the line segment to a reference page that includes a depiction of the reference object; and
      identifying a boundary of the tangible interface object based on the matching;
   generating, using the processor of the computing device, a virtualization based on the formation of the tangible interface object; and
   updating, on the display of the computing device, the graphical user interface to include the virtualization.

2. The method of claim 1, wherein the tangible interface object is a drawing and the formation of the tangible interface object is a creation of the drawing by a user.

3. The method of claim 1, wherein the reference object provides an indicator of the formation of the tangible interface object.

4. The method of claim 1, wherein detecting the formation of the tangible interface object in the interaction area further comprises:
   extracting, using the processor of the computing device, an image of the tangible interface object from the video stream based on the boundary.

5. The method of claim 4, wherein updating the graphical user interface to include the virtualization further comprises:
   matching the boundary of the extracted image with a portion of the virtual object.

6. The method of claim 1, wherein the visualization marker represents a type of the activity object and wherein identifying the activity object based on the visualization marker further comprises:
   identifying, using the processor of the computing device, the type of the activity object based on the visualization marker.

7. The method of claim 1, wherein the interaction area includes an outline of the tangible interface object.

8. A physical activity scene visualization system comprising:
   a video capture device coupled for communication with a computing device, the video capture device being adapted to capture a video stream that includes an activity object, the activity object including a reference object depicting a type of a tangible interface object to form and an interaction area, the interaction area including the tangible interface object formed in the interaction area based on the type of the tangible interface object depicted by the reference object;
   a detector coupled to the computing device, the detector being adapted to identify within the video stream the activity object and a formation of the tangible interface object in the interaction area by detecting a line segment of the tangible interface object, matching the line segment to a reference page that includes a depiction of the reference object, and identifying a boundary of the tangible interface object based on the matching;
   a processor of the computing device, the processor being adapted to identify the activity object, determine a virtual object based on the identity of the activity object, and generate a virtualization based on the formation of the tangible interface object; and
   a display coupled to the computing device, the display being adapted to display a graphical user interface embodying a virtual scene, the virtual scene including the virtual object and updating the graphical user interface to include the virtualization.

9. The physical activity scene visualization system of claim 8, wherein the tangible interface object is a drawing and the formation of the tangible interface object is a creation of the drawing by a user.

10. The physical activity scene visualization system of claim 8, wherein the reference object provides an indicator of the formation of the tangible interface object.

11. The physical activity scene visualization system of claim 8, wherein the detector is further configured to:
   extract an image of the tangible interface object from the video stream based on the boundary.

12. The physical activity scene visualization system of claim 11, wherein the processor configured to generate the virtualization is further configured to match the boundary of the extracted image with a portion of the virtual object.

13. The physical activity scene visualization system of claim 8, wherein the activity object includes a visualization marker and the visualization marker represents a type of the activity object and the detector is further configured to:
   identify the type of the activity object based on the visualization marker.

14. The physical activity scene visualization system of claim 8, wherein the interaction area includes an outline of the tangible interface object.

15. A method comprising:
   capturing, using a video capture device associated with a computing device, a video stream of a physical activity scene, the video stream including an activity object, the activity object including a visualization marker, a reference object depicting a type of a drawing to form, and an interaction area, the interaction area including the drawing by a user in the interaction area based on the type of the drawing depicted by the reference object;

identifying, using a processor of the computing device, a type of the activity object based on the visualization marker;

determining, using the processor of the computing device, a virtual scene for display, the virtual scene including a virtual object to prompt the user;

displaying, on a display of the computing device, a graphical user interface embodying a virtual scene, the virtual scene including the virtual object;

detecting, using the processor of the computing device, the drawing in the interaction area by:
  detecting a line segment of the drawing;
  matching the line segment to a reference page that includes a depiction of the reference object; and
  identifying a boundary of the drawing based on the matching;

generating, using the processor of the computing device, a virtual image of the drawing by the user; and updating, on the display of the computing device, the graphical user interface to include the virtual image of the drawing.

16. The method of claim 15, wherein the activity object is a drawing pad and the visualization marker represents a page of the drawing pad.

17. The method of claim 15, wherein the virtual object is a graphical representation of a portion of a graphical representation that is missing a feature and the drawing fills in that portion of the graphical representation with the missing feature.

18. The method of claim 17, wherein updating the graphical user interface to include the virtual image of the drawing further comprises:
  matching, using the processor of the computing device, the boundary of the drawing to the portion of the graphical representation with the missing feature.

19. The method of claim 15, wherein generating the virtual image further comprises:
  extracting, using the processor of the computing device, an image of the drawing from the video stream based on the boundary.

20. The method of claim 15, wherein the interaction area includes an outline to assist the user in creating the drawing.

* * * * *